United States Patent [19]

Hamada et al.

[11] Patent Number: 5,064,876

[45] Date of Patent: Nov. 12, 1991

[54] ADHESION PROMOTER METHOD

[75] Inventors: Yuji Hamada; Shoseku Sasaki; Hiroshi Masaoka, all of Ichihara, Japan

[73] Assignee: Toray Silicone Company, Ltd., Tokyo, Japan

[21] Appl. No.: 387,060

[22] Filed: Jul. 31, 1989

Related U.S. Application Data

[62] Division of Ser. No. 123,029, Nov. 19, 1987.

[30] Foreign Application Priority Data

Nov. 25, 1986 [JP] Japan ................................ 61-280337

[51] Int. Cl.$^5$ ............................................. C08G 77/27
[52] U.S. Cl. ..................................... 522/99; 522/148; 528/30; 528/32; 528/38; 427/387
[58] Field of Search ............... 528/30, 32, 38; 522/99, 522/148

[56] References Cited

U.S. PATENT DOCUMENTS

| | | | |
|---|---|---|---|
| 3,819,675 | 6/1974 | Plueddemann | 528/38 |
| 4,048,356 | 8/1977 | Bakos et al. | 427/379 |
| 4,197,234 | 4/1980 | Temin | 260/42.27 |
| 4,201,808 | 5/1980 | Cully et al. | 428/40 |
| 4,608,270 | 8/1986 | Varaprath | 427/35 |
| 4,697,026 | 9/1987 | Lee et al. | 556/418 |
| 4,703,074 | 10/1987 | Izutsu et al. | 524/262 |
| 4,889,905 | 12/1989 | Suzuki | 528/30 |
| 4,911,986 | 3/1990 | Keryk et al. | 522/99 |

FOREIGN PATENT DOCUMENTS

| | | |
|---|---|---|
| 1019693 | 10/1977 | Canada . |
| 2911 | 2/1978 | Japan . |
| 54-119597 | 9/1979 | Japan . |

*Primary Examiner*—John C. Bleutge
*Assistant Examiner*—Dean, Jr. R.
*Attorney, Agent, or Firm*—Roger H. Borrousch

[57] ABSTRACT

An adhesion promoter which is a silane or polysiloxane having in each molecule at least one organic group possessing aliphatic unsaturated group and at least one organic group possessing amino group or having in each molecule at least one organic group possessing both aliphatic unsaturation and an amino group is useful for improving the adhesion of radiation curable organopolysiloxane compositions to substrates.

11 Claims, No Drawings

ADHESION PROMOTER METHOD

This is a divisional of co-pending application Ser. No. 07/123,029 filed on Nov. 19, 1987.

BACKGROUND OF THE INVENTION

1. Field of the Invention

The present invention relates to an adhesion promoter for organopolysiloxane compositions which are cured by radiation, such as by an electron beam and ultraviolet radiation.

2. Prior Art

While heating is primarily used in the prior art to cure organopolysiloxane compositions, this approach does require high temperatures and long curing times. Accordingly, the last several years have been witness to research into compositions and methods by which curing can be conducted at lower temperatures and in shorter times. This research has resulted in the appearance of organopolysiloxane compositions which are cured by exposure to radiation such as an electron beam, ultraviolet radiation, etc. Such compositions are exemplified by compositions which are obtained by mixing a photosensitizer into the mixture of a mercapto group-containing organopolysiloxane and a vinyl group-containing organopolysiloxane as described in Canadian Patent No. 1,019,693 issued to Gant Oct. 25, 1977, and by compositions composed of photosensitizer plus organopolysiloxane having acryloxy or methacryloxy groups as described in Japanese Patent Publication No. 53-2911 [2,911/78].

PROBLEM TO BE SOLVED BY THE INVENTION

However, these organopolysiloxane compositions do not adhere well to the surfaces of various substrates, such as plastics, rubbers, metals. etc., after curing, and as a consequence are easily removed by rubbing with the finger, etc.

The present inventors carried out vigorous research with a view to the elimination of the above problem and this invention was developed as a consequence.

The object of the present invention is to provide an adhesion promoter which, when blended into radiation-curable organopolysiloxane or a composition thereof, will generate a substantial increase in adhesion for various substrates.

MEANS SOLVING THE PROBLEM AND FUNCTIONS THEREOF

The present invention comprises an adhesion promoter for radiation-curable organopolysiloxane, or a composition thereof, wherein said adhesion promoter consists of silane or polysiloxane having in each molecule at least one organic group possessing aliphatic unsaturation and at least one organic group possessing the amino group, or of silane or polysiloxane having in each molecule at least one organic group possessing both aliphatic unsaturation and the amino group.

SUMMARY OF THE INVENTION

The adhesion promoter of the present invention is a silane or polysiloxane which have organic groups possessing aliphatic unsaturation exemplified by lower alkenyl groups such as vinyl, allyl, propenyl, etc., and gamma-acryloxypropyl, gamma-methacryloxypropyl, gamma-acrylamidopropyl and gamma-methacrylamidopropyl and organic groups possessing the amino containing organic groups exemplified by aminoalkyl groups such as aminomethyl, aminoethyl, aminopropyl, etc. Organic groups possessing both aliphatic unsaturation and the amino group are exemplified by the N-beta-(aminoethyl)-gamma-aminopropyl group which has been acrylamidated or methacrylamidated at an amino group.

DESCRIPTION OF THE PREFERRED EMBODIMENTS

The adhesion promoters of the present invention are exemplified by organofunctional silanes such as vinylbenzylamino-propyltrimethoxysilane, vinylbenzylaminopropyltriethoxysilane, N-beta-(N-vinylbenzylaminoethyl)-gamma-aminopropyltrimethoxy-silane, N-beta-(N-vinylbenzylaminoethyl)-gamma-aminopropyltri-ethoxysilane, etc.: organopolysiloxanes which are cohydrolysis condensates involving vinyl-containing alkoxysilanes such as, vinylmethylsiloxane-aminopropylmethylsiloxane-dimethylsiloxane copolymers composed of vinylmethylsiloxane units, aminopropylmethylsiloxane units, and dimethylsiloxane units; acryloxypropylmethylsiloxane-aminopropylmethyl-siloxane-dimethylsiloxane copolymers; and organopolysiloxanes obtained by the acrylamidation of part of the amino groups of an aminoalkyl group-containing organopolysiloxane. Preferred among these are organopolysiloxanes obtained by the cohydrolysis condensation of vinyl-containing alkoxysilane and aminoalkyl-containing alkoxysilane, vinylmethylsiloxane-aminocontaining alkoxysilane, vinylmethylsiloxane-aminopropylmethylsiloxane-dimethylsiloxane copolymers, and acryloxypropylmethylsiloxane-aminopropylmethylsiloxane-dimethylsiloxane copolymers. The cohydrolysis condensates of vinyl-containing alkoxysilane and aminoalkyl-containing alkoxysilane are particularly preferred.

As examples of the synthesis of such organopolysiloxanes, one can cite the reaction of vinylbenzyl chloride with gamma-(2-aminoethyl)aminopropyltrimethoxysilane; the reaction of benzyl chloride with aminopropyltrialkoxysilane; the cohydrolysis in the presence of traces of water of vinyl-containing alkoxysilane, such as vinyltrimethoxysilane, vinyltriethoxysilane, vinyltris(-beta-methoxyethoxy)silane, etc., with aminoalkyl-containing alkoxysilane such as aminomethyltrimethoxysilane, beta-aminoethyltrimethoxysilane, gamma-aminopropyltrimethoxysilane, N-beta-(aminoethyl)-gamma-aminopropyltrimethoxysilane, etc.; the partial amidation of the amino groups of an aminoalkyl-containing polysiloxane using acrylic chloride or methacrylic chloride in a molar deficiency based on the amino groups in said polysiloxane; and copolymerization of a vinyl group-containing siloxane with an aminoalkyl group-containing siloxane.

The adhesion promoter of the invention is used by adding and blending it into a silicone composition which can be cured by exposure to radiation such as an electron beam, ultraviolet radiation, etc. In such a case, the adhesion promoter can be used as the single species, or as the mixture of two or more species.

Radiation-curable organopolysiloxanes and their compositions into which the adhesion promoter of the present invention may be blended are exemplified by compositions having as their essential component at least one type of mercaptoalkyl group-containing organopolysiloxane, organopolysiloxane having alkenyl groups such as vinyl, allyl, propenyl, etc., acryloxy group-containing or methacryloxy group-containing organopolysiloxane, styryl group-containing organopolysiloxane, or acrylamide-containing or methacrylamide-containing organopolysiloxane, and containing as necessary various additives such as, for example, reinforcing fillers, extender fillers, dyes and pigments, heat stabilizers, flame retardants, etc.

The quantity of addition of this invention's adhesion promoter to the radiation-curable organopolysiloxane or composition thereof will depend on the type of organopolysiloxane, and on whether optional additives are present, and if so, on their type and compounding proportions. As a consequence, this value cannot be given unconditionally, but roughly will be 0.1 to 30 weight parts.

Radiation-curable organopolysiloxane compositions which contain the invention's adhesion promoter have an excellent radiation curability, and adhere well to diverse substrates in contact with such compositions during their curing.

EXAMPLES

The invention will be explained in the following with reference to illustrative examples. In the examples, parts = parts by weight and curability and adhesion testing was conducted as follows.

CURABILITY AND ADHESION TESTING

The radiation-curable organopolysiloxane composition containing adhesion promoter was coated on the surface of the substrate and then cured by exposure to radiation. The surface of the obtained cured coating was then rubbed with a finger ten times. Curing of the coating was taken to be unsatisfactory when a cloudiness was induced, a condition denoted as "smearing." Furthermore, in the event of exfoliation, adhesion by the coating to the substrate was also taken to be unsatisfactory, a condition denoted as "rub off."

EXAMPLE 1

An electron beam-curable organopolysiloxane composition was prepared in the form of the mixture of 50 parts of a trimethylsiloxy-terminated dimethylsiloxane-gamma-mercaptopropylmethylsiloxane copolymer having ten gamma-mercaptopropylmethylsiloxane units in each molecule and having a degree of polymerization of 200, and 50 parts of a dimethylvinylsiloxy-terminated dimethylsiloxane-methylvinylsiloxane copolymer having 3 methylvinylsiloxane units and a degree of polymerization of 300. One part N-beta-(N-vinylbenzylaminoethyl)-gamma-aminopropyltrimethoxysilane (SH6032 from Toray Silicone Co., Ltd.) was added and mixed to homogeneity into 100 parts of this electron beam-curable organopolysiloxane composition. The obtained mixture was applied uniformly in a thickness of 1.0 g per square meter on a polyethylene-laminated paper, and was then cured by exposure to a 5 Mrad electron beam. The results of the curability and adhesion testing of this cured coating are reported in Table 1.

For comparison, the same curability and adhesion testing was conducted on the composition prepared without the addition of the adhesion promoter, and these results are also reported in Table 1 as Comparison Example 1.

TABLE 1

| PROPERTY | Example 1 | Comparison Example 1 |
| --- | --- | --- |
| smear | no | no |
| rub off | no | yes |

EXAMPLE 2

148 Parts vinyltrimethoxysilane (SZ6300 from Toray Silicone Co., Ltd.) and 228 parts N-beta-(aminoethyl)-gamma-aminopropyltrimethoxysilane (SH6020 from Toray Silicone Co., Ltd.) were placed in a three-neck flask equipped with stirrer and reflux condenser. This was stirred at 50° C. for 10 minutes while 6 g ion-exchanged water was added dropwise in order to prepare an adhesion promoter in the form of the cohydrolyzate of vinyltrimethoxysilane and N-beta-(aminoethyl)-gamma-aminopropyl-trimethoxysilane. One part of this adhesion promoter was added and mixed to homogeneity into 100 parts of an electron beam-curable organopolysiloxane composition prepared as in Example 1. The obtained mixture was uniformly applied in a thickness of 1.0 g per square meter on polyethylene-laminated paper, and was then cured by exposure to a 5 Mrad electron beam. The cured coating was tested for curability and adhesion, and these results are reported in Table 2.

For comparison, compositions were prepared in which one contained only vinyltrimethoxysilane in place of the above adhesion promoter (Comparison Example 2), and in which one contained only N-beta-(aminoethyl)-gamma-aminopropyltrimethoxysilane in place of the above adhesion promoter (Comparison Example 3). These compositions were tested for curability and adhesion, and these results are reported in Table 2 as Comparison Example 2 and Comparison Example 3, respectively.

TABLE 2

| PROPERTY | Example 2 | Comparison Example 2 | Comparison Example 3 |
| --- | --- | --- | --- |
| smear | no | yes | no |
| rub off | no | — | yes |

EXAMPLE 3

2 Parts benzophenone was added and blended into 100 parts of the electron beam-curable organopolysiloxane composition whose preparation is described in Example 1 to afford an ultraviolet-curable organopolysiloxane composition. To 100 parts of this composition was added 10 parts of a trimethylsiloxy- terminated organopolysiloxane (degree of polymerization = 70) composed of gamma-acryloxypropylmethylsiloxane units:gamma-aminopropyl-methylsiloxane units:dimethylsiloxane units in a 3:3:64 molar ratio, followed by mixing to homogeneity. This was applied in a thickness of 1.0 g per square meter on glassine paper, and was then exposed to ultraviolet energy from a 160 kW/cm mercury lamp for 1 second at a distance of 10 cm. The curability and adhesion of the cured coating were then evaluated, and these results are reported in Table 3.

For comparison, the curability and adhesion of the above ultraviolet-curable organopolysiloxane composition, without the addition of the adhesion promoter, were evaluated as above, and these results are reported in Table 3 as Comparison Example 4.

TABLE 3

| PROPERTY | Example 3 | Comparison Example 4 |
| --- | --- | --- |
| smear | no | no |
| rub off | no | yes |

EXAMPLE 4

To prepare the adhesion promoter, a mixture of aminoethylaminopropyldimethoxysilane hydrolyzate, polydimethylsiloxane cyclics, polymethylvinylsiloxane cyclics, and hexamethyldisiloxane was equilibrated to afford a trimethylsiloxy-terminated organopolysiloxane (degree of polymerization=202) composed of gamma-aminopropyl-methylsiloxane units:vinylmethylsiloxane units:dimethylsiloxane units in a 5:5:190 molar ratio. An electron beam-curable organopolysiloxane composition was prepared by mixing 50 parts of this organopolysiloxane to homogeneity with 50 parts of a trimethylsiloxy-terminated organopolysiloxane composed of mercaptopropylmethylsiloxane units:dimethylsiloxane units in a 15:185 molar ratio. The resulting composition was uniformly applied at 1.0 g per square meter on polyethylene-laminated paper, and was then cured by exposing this coated surface to a 1 Mrad electron beam. Curability and adhesion tests were then conducted on this cured coating, and the these results are reported in Table 5.

For comparison, a composition was prepared which contained, in place of the above adhesion promoter, a trimethylsiloxy-terminated organopolysiloxane composed of vinylmethylsiloxane units:dimethylsiloxane units in a 5:190 molar ratio. It was subjected to curability and adhesion testing, and these results are also reported in Table 4 as Comparison Example 5.

TABLE 4

| PROPERTY | Example 4 | Comparison Example 5 |
| --- | --- | --- |
| smear | no | no |
| rub off | no | yes |

EXAMPLE 5

To prepare an organopolysiloxane having both the acrylic group and amino group in the same molecule, acrylic chloride (at 0.8 moles per 1 mole amino hydrogen in the following polysiloxane) was added to and reacted with a trimethylsiloxy- terminated organopolysiloxane (degree of polymerization=77) composed of 5 moles N-beta-(aminoethyl)-gamma-aminopropylmethylsiloxane units and 70 moles dimethylsiloxane units.

An ultraviolet-curable organopolysiloxane composition was prepared by mixing 5 parts dimethyl benzil ketal into the electron beam-curable organopolysiloxane composition used in Example 1. Ten parts of the organopolysiloxane prepared as described above was added to 100 parts of this UV-curing organopolysiloxane composition. This mixture was uniformly applied at 0.3 g per square meter on polyethylene film, followed by exposure to ultraviolet radiation from a 160 W/cm high-pressure mercury lamp for 0.05 seconds. The curability and adhesion were then evaluated, and these results are reported in Table 5.

For comparison, organopolysiloxane in which all amino groups were amidated was synthesized as above with the exception that the acrylic chloride was added at twice the above quantity. Using this organopolysiloxane in place of the above adhesion promoter, the curability and adhesion of the cured coating were examined as above, and these results are reported in Table 5 as Comparison Example 6.

TABLE 5

| PROPERTY | Example 5 | Comparison Example 6 |
| --- | --- | --- |
| smear | no | no |
| rub off | no | yes |

EFFECTS OF THE INVENTION

Because the adhesion promoter of the present invention is a silane or polysiloxane having in each molecule at least one organic group possessing aliphatic unsaturation and at least one organic group possessing the amino group, or a silane or polysiloxane having in each molecule at least one organic group containing both aliphatic unsaturation and the amino group, when it is blended into a radiation (electron beam, ultraviolet radiation, etc.)-curable organopolysiloxane or composition thereof, it characteristically provides a substantial improvement in the adhesion of such organopolysiloxanes or their compositions to various substrates.

That which is claimed is:

1. In a method of coating a substrate with a radiation curable composition, the improvement comprising adding and blending an adhesion promoter into a silicone composition which can be cured by exposure to radiation, coating the substrate with the resulting composition, exposing the coated substrate to radiation, and obtaining a coated substrate wherein the coating exhibits improved adhesion to the substrate, wherein the adhesion promoter is an organopolysiloxane selected from the group consisting of copolymers of vinylmethyl-siloxane units, aminopropylmethylsiloxane units, and dimethylsiloxane units; copolymers of acryloxypropylmethyl-siloxane units, aminopropylmethylsiloxane units, and dimethylsiloxane units; cohydrolyzates of vinyl-containing alkoxysilane and aminoalkyl-containing alkoxysilane; copolymers of trimethylsiloxy units, gamma-acryloxypropylmethylsiloxane units, gamma-aminopropylsiloxane units, and dimethylsiloxane units; copolymers of trimethylsiloxy units, gamma-aminopropylmethylsiloxane units, vinylmethylsiloxane units, and dimethylsiloxane units; and copolymers of trimethylsiloxy units, N-beta-(aminoethyl)-gamma-aminopropylmethylsiloxane units, and dimethylsiloxane units wherein some of the amino hydrogen are reacted with acrylic chloride to provide the acrylic group.

2. The method according to claim 1 in which the adhesion promoter is a cohydrolyzate of vinylrimethoxysilane and N-beta-(aminoethyl)-gamma-aminopropyltrimethoxysilane.

3. The method according to claim 1 in which adhesion promoter is a copolymer consisting of trimethylsiloxy units, gamma-acryloxpropylmethylsiloxane units, gamma-aminopropylsiloxane units, and dimethylsiloxane units.

4. The method according to claim 1 in which the adhesion promoter is a copolymer consisting of trimethylsiloxy units, gamma-aminopropylmethylsiloxane units, vinylmethylsiloxane units, and dimethylsiloxane units.

5. The method according to claim 1 in which adhesion promoter is a copolymer of trimethylsiloxy units, N-beta-(aminoethyl)-gamma-aminopropylmethylsiloxane units, and dimethylsiloxane units wherein some of the amino hydrogen are reacted with acrylic chloride to provide the acrylic group.

6. The method according to claim 1 in which the silicone composition has an essential component a radiation curable organopolysiloxane selected from the group consisting of mercaptoalkyl containing organopolysiloxane, organopolysiloxane having alkenyl groups, acryloxy containing organopolysiloxane, methacryloxy containing organopolysiloxane, styryl containing organopolysiloxane, acrylamide containing organopolysiloxane, and methacrylamide containing organopolysiloxane, and mixtures thereof.

7. The method according to claim 6 in which the adhesion promoter is N-beta-(N-vinylbenzylaminoethyl)-gamma-aminopropyltrimethoxysilane and the essential component of the silicone composition is a mixture of mercaptoalkyl containing organopolysiloxane and organopolysiloxane having alkenyl groups.

8. The method according to claim 6 in which the adhesion promoter is a cohydrolyzate of vinyltrimethoxysilane and N-beta-(aminoethyl)-gamma-aminopropyltrimethoxysilane and the essential component of the silicone composition is a mixture of mercaptoalkyl containing organopolysiloxane and organopolysiloxane having alkenyl groups.

9. The method according to claim 6 in which adhesion promoter is a copolymer consisting of trimethylsiloxy units, gamma-acryloxypropylmethylsiloxane units, gamma-aminopropylsiloxane units, and dimethylsiloxane units and the essential component of the silicone composition is a mixture of mercaptoalkyl containing organopolysiloxane and organopolysiloxane having alkenyl groups.

10. The method according to claim 6 in which the adhesion promoter is a copolymer consisting of trimethylsiloxy units, gamma-aminopropylmethylsiloxane units, vinylmethylsiloxane units, and dimethylsikloxane units and the essential components of the silicone composition is a mixture of mercaptoalkyl containing organopolysiloxane and organopolysiloxane having alkenyl groups.

11. The method according to claim 6 in which adhesion promoter is a copolymer of trimethylsiloxy units, N-beta-(aminoethyl)-gamma-aminopropylmethylsiloxane units, and dimethylsiloxane units wherein some of the amino hydrogen are reacted with acrylic chloride to provide the acrylic group and the essential component of the silicone composition is a mixture of mercaptoalkyl containing organopolysiloxane and organopolysiloxane having alkenyl groups.

* * * * *